May 12, 1942.　　A. F. KAPTULLER　　2,282,521
MACHINE FOR CHOPPING FOODS
Filed March 20, 1940　　2 Sheets-Sheet 2

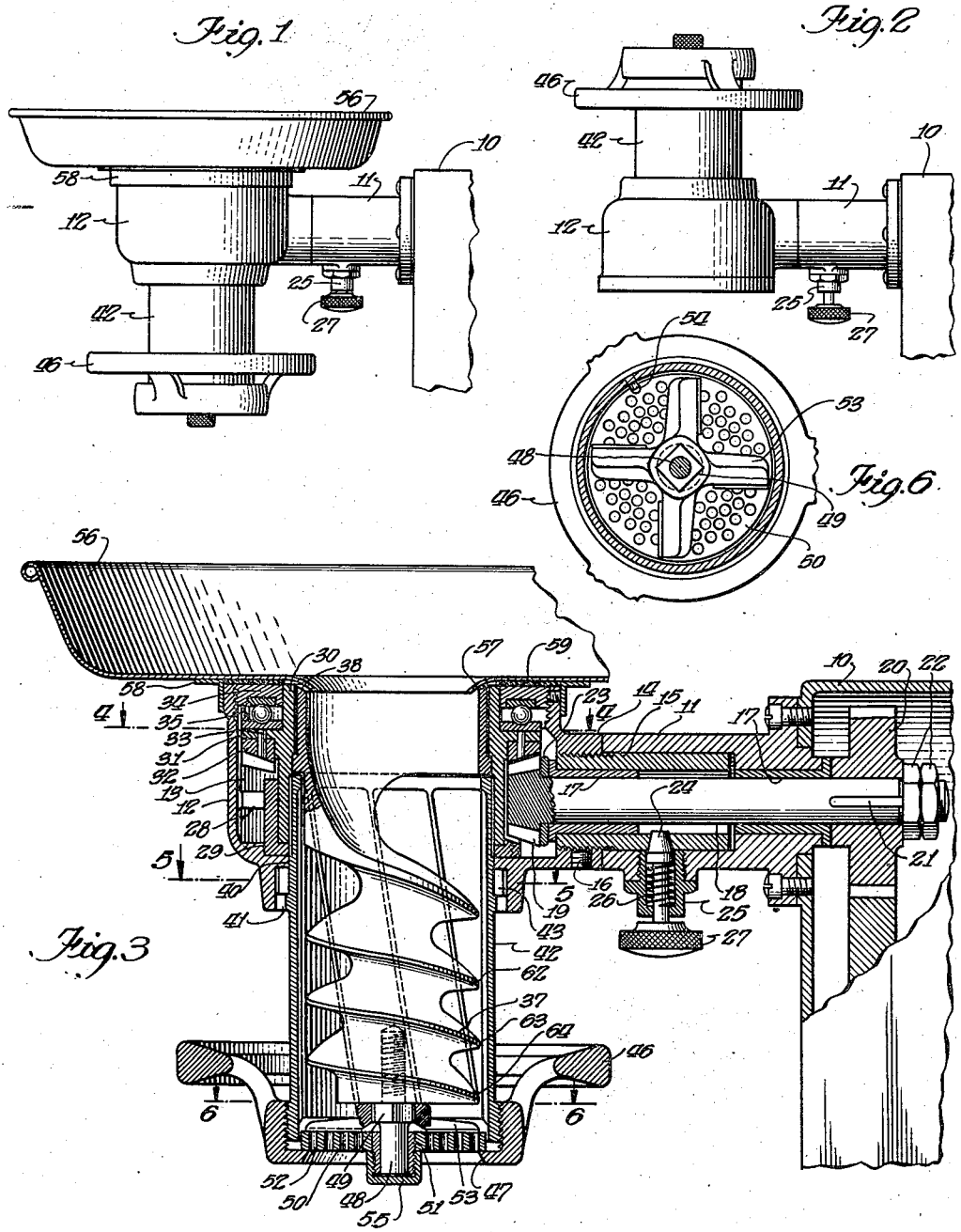

Inventor:
Alexander F. Kaptuller
By: Leslie W. Frier
　　Attorney.

Patented May 12, 1942

2,282,521

UNITED STATES PATENT OFFICE 2,282,521

MACHINE FOR CHOPPING FOODS

Alexander F. Kaptuller, Chicago, Ill.

Application March 20, 1940, Serial No. 324,936

8 Claims. (Cl. 146—192)

My invention relates to machines for chopping or mixing food materials or the like.

It is an object of my invention to provide an improved arrangement of this type having interchangeable attachments which may be readily removed from or operatively connected to the machine.

My improved arrangement preferably comprises a housing, mounted on a laterally extending support, for receiving the driven members of the respective mixing and chopping attachments connected with the operating means therefor, and it is an object of my invention to journal the housing to the support in such manner that the housing may be rotated on the support and the attachments quickly and easily removed from or put into their operative positions.

My invention preferably includes a housing having an opening normally vertical, for the passage of food materials, etc. therethrough, and a driven ring surrounding the opening. It is a further object of my invention to provide operating means for an attachment which includes means insertable upwardly into the discharge end of the vertical opening and adapted to have a sliding and non-rotatable connection with the driven ring so that the parts may be readily connected or disconnected as desired.

In its preferred form I also provide on the housing stationary sleeve-like enclosure means for a feed screw of the chopping attachment; and it is a further object of my invention to provide on the housing and said enclosure means spaced and overlapping flanges adapted to form a ready connection between the parts.

It is another object of my invention to provide in an arrangement of this type an improved feed screw which is so designed as to operate efficiently in compressing the materials to be chopped and forcing them through the cutting means at the discharge end of the enclosure member.

The chopping attachment of my improved arrangement preferably comprises a feed screw positioned in the stationary enclosure member and having a stub shaft on its discharge end, and cutting means at the discharge end of the enclosure member in the form of a plate having a central opening for receiving the stub shaft and having a plurality of perforations about the opening, and it is another object of my invention to provide means at the bottom of the central opening of the plate for stopping juice from the material being chopped from flowing through the bearing of the plate and stub shaft and into the material discharged through the perforations of the plate.

The preferred means by which I have accomplished my several objects are illustrated in the drawings and are hereinafter specifically described. That which I believe to be new and desire to cover by Letters Patent is set forth in the claims.

In the drawings,

Fig. 1 is an elevational view of my improved arrangement when used as a chopper;

Fig. 2 is an elevational view of the arrangement with certain of the parts in different adjusted positions;

Fig. 3 is a vertical sectional view, on an enlarged scale, of my improved machine equipped with the chopping attachment;

Figure 4:
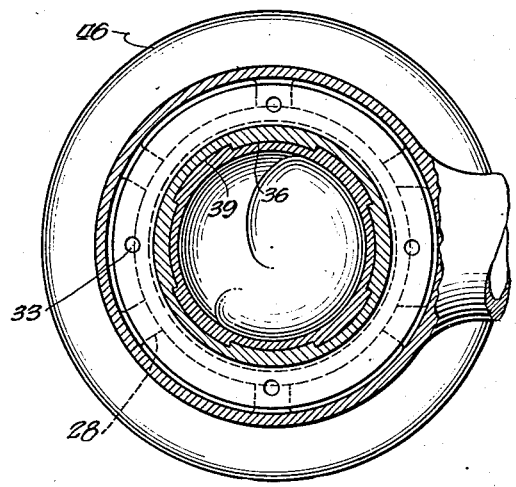
Figure 5:
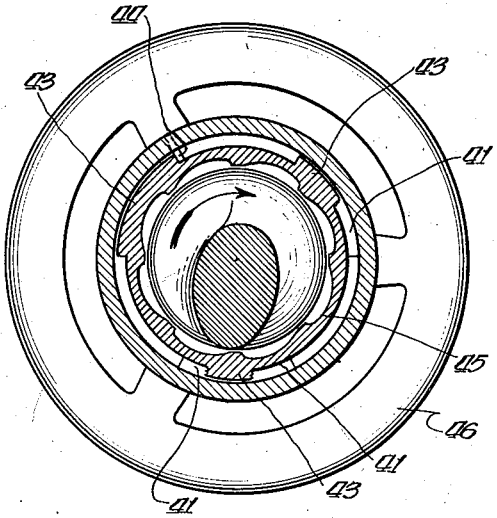
Figure 7:
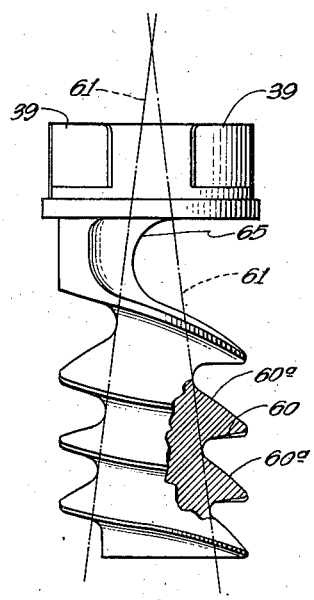

Figs. 4, 5 and 6 are sectional views taken on lines 4—4, 5—5 and 6—6, respectively, of Fig. 3; and Fig. 7 is an elevational view of the feed screw of the chopping attachment.

Like characters of reference designate like parts in the several views.

Referring now to Figs. 1 to 3, my improved machine for chopping materials, such as meat, comprises a housing 10 for the driving means of the machine having attached thereto a laterally extending supporting member 11. A housing 12 having a passageway 13 extending therethrough, normally vertical, is provided with a sidewardly extending pipe-like flange 14 with a sleeve 15 positioned therein. The sleeve 15 is screwed into the flange 14 and is held against rotary movement relative to the flange by a set screw 16.

Sleeve-like bushings 17 are provided in the supporting member 11 and in the sleeve 15 as shown. A shaft 18 extends through the bushings or bearings 17 and on its end in the housing 12 is provided with a pinion gear 19. On its end in the housing 10, the shaft 18 is provided with a gear 20 which acts with other suitable driving means conencted therewith to rotate the shaft. The gear 20 is fixed on the shaft 18 by a key 21 and nuts 22. A thrust washer 23 is provided between the pinion gear 19 and the adjacent bearing 17 in the sleeve 15, as shown.

A plunger 24 positioned in a plunger housing 25, which is extended through the supporting member 11, fits into a corresponding opening in the sleeve 15 and holds the sleeve and housing 12 against rotary movement relative to the supporting member 11. A spring 26 acts to move the plunger inwardly, and a knob 27 is provided on the outer end of the plunger 24 for pulling the plunger outwardly from its opening in the sleeve to permit the sleeve and housing 12 to rotate relative to the supporting member 11.

In its internal passageway 13, the housing 12 is provided with a plurality of inwardly extending radial ribs 28. A bearing sleeve 29 fits tightly inside the ribs. A revolvable ring or sleeve 30 having an outwardly extending flange 31 seats in the bearing 29. A ring gear 32 meshing with the pinion gear 19 is fixed to the bottom surface of the flange 31 by pins 33. At the inlet end of the passageway 13, an upper bearing ring 34 is secured to the housing 12. A lower bearing ring 35 is provided on the flange 31, and bearing balls provide an anti-friction thrust bearing between the rings 34 and 35.

As shown in Fig. 4, the driven sleeve 30 is provided on its inside surface with a plurality of splines 36. A feed screw 37 extends into the passage 13 at the bottom or discharge end and towards the inlet end thereof, being provided with a sleeve or ring 38 on its upper end having splines 39 interfitting with the splines 36 of the sleeve 30 thereby providing a slidable but non-rotatable, quickly made, connection between the feed screw and the driven sleeve 30. The arrangement is such that the feed screw 37 may be readily withdrawn from engagement with the sleeve 30 by downward movement out through the discharge end of the passageway of the housing.

The housing 12 is provided with an internal, inwardly extending flange 40 and below the flange with three spaced, inwardly extending, arcuate flanges 41 as shown in Fig. 5. An enclosure member 42 fits around the feed screw and is provided on its outer surface with three spaced, outwardly extending arcuate flanges 43. The flanges 43 are of such size that they pass freely between the flanges 41, and by rotating the enclosure member, the flanges 43 may be brought into overlying position on the flanges 41. Stop means in the form of a pin 44 is provided in the housing 12 between the flanges 40 and 41 for limiting rotation of the enclosure member 42 with respect to the housing. Spiral recesses 45 are provided in the enclosure member 42 for purposes to be hereinafter described.

A hand wheel 46 is provided on the lower or discharge end of the enclosure member 42. The hand wheel is screwed onto the enclosure member 42 and is provided with a central discharge opening 47.

The feed screw 37 is provided on its lower or discharge end with a centrally located fixed stub shaft 48. Adjacent the end of the feed screw, the shaft 48 is provided with a squared portion 49 as shown. A cutting or extrusion plate 50, having a central opening to receive a short sleeve or bushing 51 and having a plurality of perforations 52 about the central opening, is provided in the discharge end of the enclosure member 42 and is held in such position by the hand wheel 46. A four-bladed cutting knife 53 is provided on the squared portion 49 of the shaft 48 and turns with the feed screw. The knife 53 rests on the cutting plate, and the plate 50 is held against rotation with the knife 53 by a pin 54 provided in the enclosure member 42 at its discharge end and projecting into a small peripheral opening in the plate 50, as shown in Fig. 6. The bushing 51 receives the stub shaft 48 and projects outwardly from the plate 50. An inverted cap 55 surrounds and is threaded to the bushing 51 for purposes to be hereinafter described.

A pan 56 is provided on the upper or inlet end of the housing 12 and has an opening 57 in alignment with the central opening in the sleeve 38 of the feed screw. The pan is held in position by an angle member 58 carried thereby and fitting around the housing 12. A member 59 of rubber or other yielding material is provided between the parts for cushioning the pan on the ring 34 and the housing 12.

I have found that a feed screw of the form shown is particularly efficient when used in my chopping machine. As will be seen in Fig. 7, the sides of the screw threads 60 facing the cutting means, comprising the rotary cutter 53 and the plate 50, are substantially straight and are disposed substantially at right angles to the longitudinal axis of the screw. The sides 60a of the screw, facing the sides 60, are also substantially straight but are disposed at angles much less than a right angle with respect to said axis. The arrangement is such that the spaces between adjacent screw surfaces 60 and 60a and the wall of the surrounding casing are substantially triangular, the surface 60 being one side, the casing wall the other side and the surface 60a the hypotenuse of such triangular spaces. The material between the threads of the screw, therefore, is forced by its engagement with the surfaces 60 substantially directly towards the cutting means when the screw is turned. It will be noted that the shank portion of the screw which is bounded by the broken lines 61 increases in diameter towards the discharge end of the screw. The internal diameter of the enclosure member 42 is substantially uniform throughout its length, and that portion of the screw surrounded by the enclosure member is also substantially uniform in diameter.

When the driving means connected with the gear 20 is put into operation, the gear 20 and the shaft 18 connected therewith rotate. The pinion gear 19 revolves, and the sleeve 30 rotates in its bearing 29 by reason of its connection through the ring gear 32 with the pinion 19. The screw 37 is non-rotatably connected with the sleeve 30, by reason of the interfitting splines 36 and 39, and the screw 37 rotates with the sleeve 30. The knife 53 also rotates on the plate 50 with rotation of the screw 37, as will be readily understood.

Meat or other material to be chopped may be placed in the pan 56 and fed into the screw sleeve 38 through the pan opening 57. The material drops by gravity into the screw, and comes into contact with those portions of the screw facing the discharge end of the screw, and as the screw rotates the material is forced downwardly towards the cutting knife 53 and cutting plate 50. It will be noted that the zone between the screw threads 62 and 63 and the enclosure member 42, see Fig. 3, is greater in cross section than the zone between the screw threads 63 and 64 and the enclosure member, and in general the zones between adjacent screw threads and the enclosure member decrease in cross sectional area toward the discharge end of the screw. The material in passing from a higher zone to a lower zone decreases in volume and as the material progresses downwardly in the spiral chamber between the screw threads and enclosure member it is compressed to a greater and greater extent. It will be appreciated that the recesses 45 in the enclosure member 42 prevent the material, as it travels from the upper end of the enclosure member to its lower end, from turning with the screw. When the material reaches the discharge end of the enclosure member it is cut by the rotary cutter 53 and is forced through the perforations 52 of the plate 50 by the action of the screw into a suitable container (not shown).

The cap 55 on the outer end of the bushing 51 prevents juice from the material which passes through the bearing between the bushing and shaft 48 from reaching the ground material extruded through the plate 50 by catching the juice. I have found that the juice passing through the bearing is small in quantity but contaminates the material if permitted to pass through the bearing.

My improved chopping machine arrangement for meat or other material may be readily disassembled for cleaning. It is preferable to first remove the pan 56 from its position on the housing 12, and then if desired, in order to manipulate the parts more easily, the housing 12 and associated parts may be rotated from a position shown in Fig. 1 to a position shown in Fig. 2 or to some position therebetween by pulling the plunger 24 out of its opening in the sleeve 15. The enclosure member 42 may be removed from the housing 12 by rotating it slightly so that its flanges 43 are in position to pass between the flanges 41 of the housing 12. The enclosure member may then be pulled outwardly from the housing 12 by means of the hand wheel 46, and the screw 37 is simultaneously removed from the sleeve 30. The plate 50 may be removed from the enclosure member 42 simply by unscrewing the hand wheel 46 from the enclosure member, and the cap 55 may be removed from the bushing 51 by unscrewing it. When the parts are thus separated they may be easily washed.

When the housing 12 is turned, for example, into the position shown in Fig. 2, the screw 37 may be put easily into proper position with the splines 39 in interengagement with the splines 36 of the sleeve 30, and the enclosure member 42 also may be put easily into its proper position by passing its flanges 43 between the flanges 41 of the housing 12 and then turning the enclosure member slightly, these operations being readily carried out because the coengaging parts are in sight.

My improved chopping machine not only chops efficiently but it is safe to operate. If a person places his fingers through the pan opening 57, either accidentally or otherwise, when the screw 37 is revolving, the operator's fingers will not be injured. The fingers will simply slide along the upper leading edge 65 of the screw to the center of the screw and away from the cutting edges between the screw and the enclosure member 42.

I do not intend to limit the invention to the details of construction shown and described except only insofar as certain of the appended claims are specifically so limited, as it will be obvious that modifications may be made without departing from the principles of the invention.

I claim:

1. In a machine of the type described, the combination of a housing having a passageway therethrough with inlet and discharge ends, a driven ring in said passageway and journaled in said housing, means for operating on the material being treated including a sleeve extending into the discharge end of said passageway and having a slidable and non-rotatable connection with said ring whereby the operating means may be readily removed from said housing, enclosure means surrounding at least a portion of said operating means, and interengaging means on said housing and said enclosure means for ready and rigid attachment of the latter to the former and for ready separation of the same.

2. In a machine of the type described, the combination of a laterally extending support, a housing journaled on said support and having a passageway therethrough with inlet and discharge ends, means for holding the housing against movement relative to the support, a driven ring in said passageway and journaled in said housing, means for operating on the material being treated including a sleeve extending into the discharge end of said passageway and having a slidable and non-rotatable connection with said ring whereby the operating means may be readily removed from said housing, enclosure means surrounding at least a portion of said operating means, and interengaging means on said housing and said enclosure means for ready and rigid attachment of the latter to the former and for ready separation of the same.

3. In a machine of the type described, the combination of a laterally extending support, a drive shaft journaled in said support, a housing journaled on said support and having a passageway therethrough with inlet and discharge ends, means for holding the housing against movement relative to the support, a ring in said passageway and journaled in said housing, gear means connecting said ring with said shaft, means for operating on the material being treated including a sleeve extending into the discharge end of said passageway and having a slidable and non-rotatable connection with said ring whereby the operating means may be readily removed from said housing, enclosure means surrounding at least a portion of said operating means, and interengaging means on said housing and said enclosure means for ready and rigid attachment of the latter to the former and for ready separation of the same.

4. In a machine of the type described, the combination of a housing having a way for the passage of material therethrough, a driven ring in said way and journaled in said housing, a feed screw having at its entrance end a sleeve, said sleeve extending into the discharge end of said way and having a slidable and non-rotatable connection with said ring whereby the feed screw may be readily removed from said housing, enclosing means surrounding said screw for providing pressure zones for the material between the inner walls of said enclosing means and the threads of said screw, and cutting means at the discharge end of said enclosing means, the opposite end of said enclosing means, being readily attached rigidly to and detached from said housing.

5. In a machine of the type described, the combination of a housing having a way for the passage of material therethrough and a bearing seat surrounding said way, a driven ring in said way and journaled in said housing, said ring having a bearing seat adjacent said first named seat, anti-friction means between said seats, a feed screw having at its entrance end a sleeve, said sleeve extending into the discharge end of said way and having a slidable and non-rotatable connection with said ring whereby the feed screw may be readily removed from said housing, enclosing means surrounding said screw for providing pressure zones for the material between the inner walls of said enclosing means and the threads of said screw, and cutting means at the discharge end of said enclosing means, the opposite end of said enclosing means being readily attached rigidly to and detached from said housing.

6. In a machine of the type described, the combination of a housing having a way for the passage of material therethrough and a bearing seat surrounding said way, a ring in said way and journaled in said housing, said ring having an outwardly extending flange providing on one side a bearing seat adjacent said first named seat, anti-friction means between said seats, a ring gear fixed to the other side of said flange, a drive shaft having a pinion meshing with said ring gear, a feed screw having at its entrance end a sleeve, said sleeve extending into the discharge end of said way and having a slidable and non-rotatable connection with said ring whereby the feed screw may be readily removed from said housing, enclosing means surrounding said screw for providing pressure zones for the material between the inner walls of said enclosing means and the threads of said screw, and cutting means at the discharge end of said enclosing means, the opposite end of said enclosing means being readily attached rigidly to and detached from said housing.

7. In a machine of the type described, the combination of a housing having a passageway therethrough with inlet and discharge ends, a driven ring in said passageway and journaled in said housing, means for operating on the material being treated including a sleeve extending into the discharge end of said passageway and into said ring, said ring and said sleeve having interengaging splines providing a slidable and non-rotatable connection between the sleeve and the ring whereby the operating means may be readily removed from the housing, enclosure means surrounding at least a portion of said operating means, and interengaging means on said housing and said enclosure means for ready and rigid attachment of the latter to the former and for ready separation of the same.

8. In a machine of the type described, the combination of a housing having a way for the passage of material therethrough, a driven ring in said way and journaled in said housing, a feed screw having at its entrance end a sleeve, said sleeve extending into the discharge end of said way and into said ring, said ring and said sleeve having interengaging splines providing a slidable and non-rotatable connection between the sleeve and the ring whereby the feed screw may be readily removed from the housing, enclosing means surrounding said screw for providing pressure zones for the material between the inner walls of said enclosing means and the threads of said screw, and cutting means at the discharge end of said enclosing means, the opposite end of said enclosing means being readily attached rigidly to and detached from said housing.

ALEXANDER F. KAPTULLER.